(No Model.)
H. PANGBORN.
LOG BINDER.
No. 323,445. Patented Aug. 4, 1885.
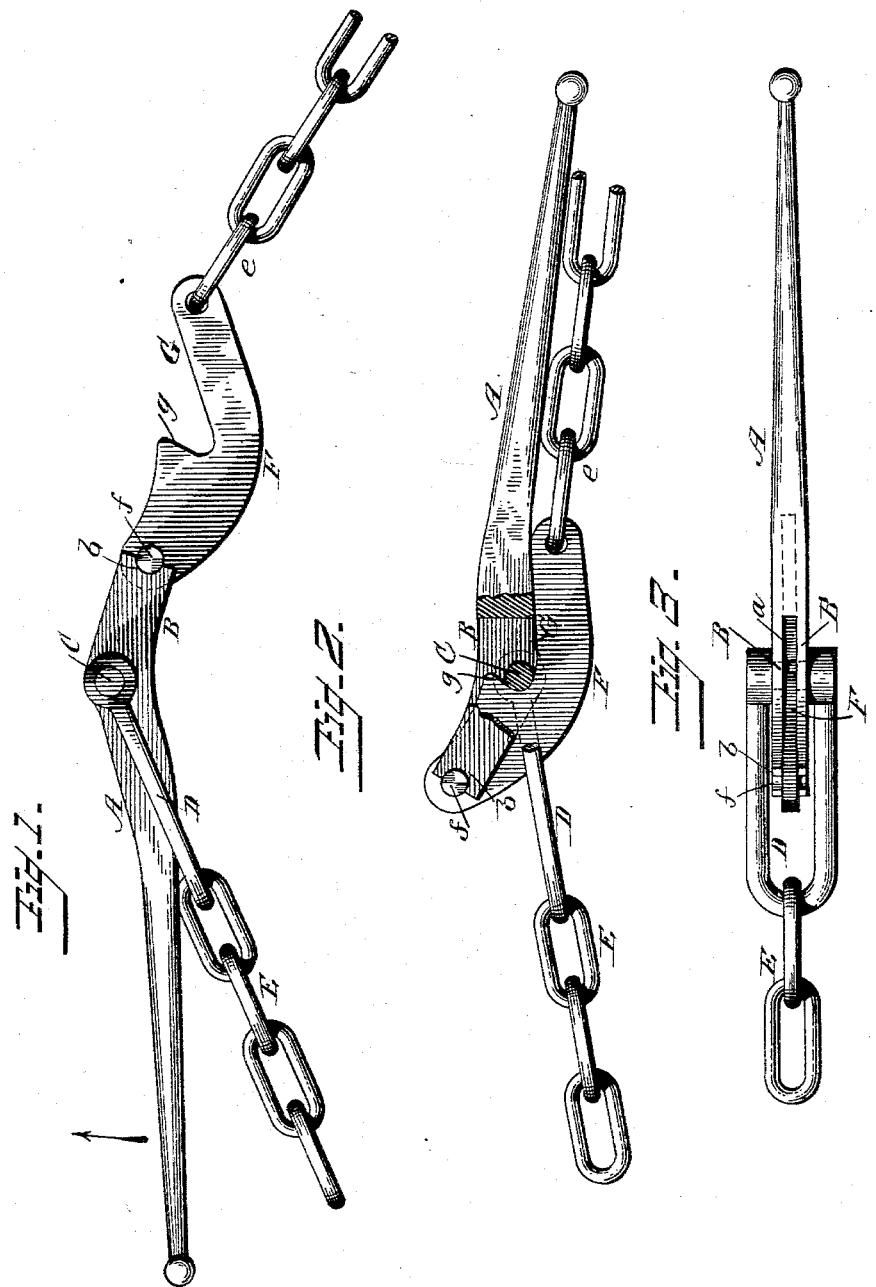
Witnesses
Inventor
Henry Pangborn.
By his Attorney Chas. H. Fowler

UNITED STATES PATENT OFFICE.

HENRY PANGBORN, OF LEE'S CORNER, MICHIGAN.

LOG-BINDER.

SPECIFICATION forming part of Letters Patent No. 323,445, dated August 4, 1885.

Application filed April 29, 1885. (No model.)

*To all whom it may concern:*

Be it known that I, HENRY PANGBORN, a citizen of the United States, residing at Lee's Corner, in the county of Midland and State of Michigan, have invented certain new and useful Improvements in Log-Binders; and I do hereby declare that the following is a full, clear, and exact description of the same, reference being had to the annexed drawings, making a part of this specification, and to the letters and figures of reference marked thereon.

This invention is an improvement in log-binders, and has for an object to provide a simple construction by which the tightening of the binding-chain may be efficiently secured, and the chain, when tightened, will be securely held.

The invention consists in certain novel constructions and combinations of parts, as will be hereinafter described and claimed.

In the drawings, Figure 1 is a side view of the device, with the parts in position to be operated to bind the logs. Fig. 2 is a similar view with the parts in the bound position, and Fig. 3 is an edge view of the device with the parts as shown in Fig. 2.

The lever A has its end bifurcated by slot a, forming the arms B B, in the ends of which I form notches b b. The lever is bent near its slotted end, and through it, near the base of slot a, and out of line therewith, I place a stud, C, which is preferably extended to the opposite sides of the lever, and serves as a pivot for the link or clevis D, to which is attached one end, E, of the binding-chain.

It will be noticed that the stud C and the point of attachment of the link D are both out of line with the notches b, with reference to the length of the lever.

The plate F is attached at one end to the end e of the binding-chain, and is provided at or near its other end with lateral studs f, fitted to engage in the notches b. This plate F is fitted to operate between the arms B of the lever, and is bent in a curve corresponding to the curvature of the slotted end of the said lever. I form this plate F with a depression, G, between its ends, which fits over the stud C, and enables the said stud to move into said plate, as shown in Fig. 2.

By preference, the forward wall, g, of the depression or recess G is made hook-shaped, as shown, so that it will engage on the stud C. The inner and outer ends of said hook g are slightly rounded, so the hook can by force on the lever be pressed into and out of engagement with the stud, and such stud and notches b and the hook g and studs f are so arranged that when the hook is engaged with the stud it cannot be disengaged without the studs f, and slightly raised from seats b, and vice versa.

In operation it will be seen that if the parts be arranged as shown in Fig. 1, and then be adjusted as shown in Fig. 2, the binding-chain will be drawn taut, and will be locked by the arrangement of parts b, f, and C, and the point of attachment of the end e with the plate F. This plate F, fitting between the arms B, operates as a guide for the lever in operating the same, and the relative arrangement of stud C, notches b and studs f, and hook g operates to lock the lever by the tensile strain on the binding-chain serving to hold studs f in notches b when the parts are fastened. Manifestly the reversal of the order of construction before described may be effected without departing from the broad principles of the invention. To this end the notches b might be formed in the plate F, and the studs f on the lever, and the plate F might be slotted instead of the lever.

Having thus described my invention, what I claim, and desire to secure by Letters Patent, is—

In a log-binder, a lever bifurcated at its end, which bifurcation consists of two notched arms having studs upon their outer sides for connecting thereto the link or clevis, in combination with a curved plate provided with studs to engage with the notches in the arms, and a recess or hook-shaped depression to engage with the studs on the notched arms, substantially as and for the purpose set forth.

In testimony that I claim the above I have hereunto subscribed my name in the presence of two witnesses.

HENRY PANGBORN.

Witnesses:
FRED. WELLINGTON,
A. H. SWARTHOUT.